No. 833,351. PATENTED OCT. 16, 1906.
H. P. TOWNSEND.
CHUCK.
APPLICATION FILED JULY 10, 1905.
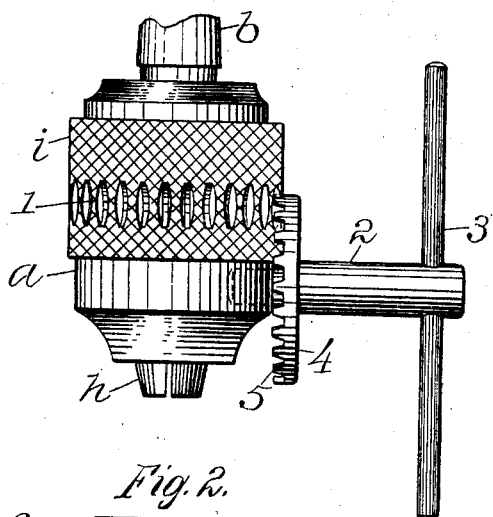
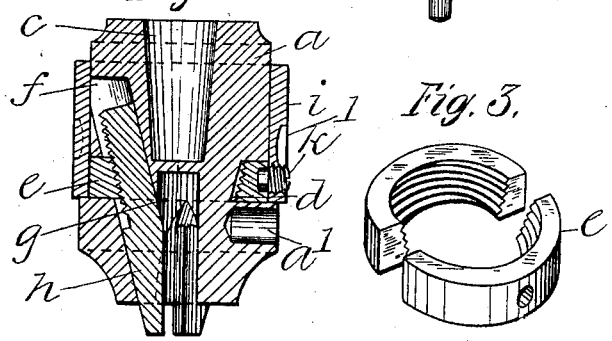
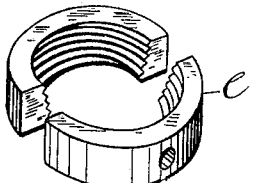
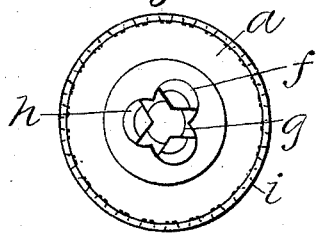
Witnesses:
D. B. Berkovitch
Cara E. Johnson
Inventor:
Harry P. Townsend.
by Jenkins & Barker
Attorneys.

UNITED STATES PATENT OFFICE.

HARRY P. TOWNSEND, OF NEW BRITAIN, CONNECTICUT, ASSIGNOR TO THE UNION MANUFACTURING COMPANY, OF NEW BRITAIN, CONNECTICUT, A CORPORATION OF CONNECTICUT.

CHUCK.

No. 833,351.     Specification of Letters Patent.     Patented Oct. 16, 1906.

Application filed July 10, 1905. Serial No. 268,970.

*To all whom it may concern:*

Be it known that I, HARRY P. TOWNSEND, a citizen of the United States, and a resident of New Britain, in the county of Hartford and State of Connecticut, have invented a new and Improved Chuck, of which the following is a specification.

My invention relates more especially to the class of drill-chucks in which a rotating sleeve is employed to operate the jaws to open or close upon the shank of a tool; and the objects of my invention are to provide a device for turning the sleeve with a rapid movement, to provide such a device for turning the sleeve in which undue strain shall not be brought upon the shank of the tool; to provide a device which shall be free from projections objectionable in the manual use of the sleeve, and, further, one in which there is little danger of catching the fingers in the use of the mechanical device for turning the sleeve. A form of device in the use of which these objects may be attained is illustrated in the accompanying drawings, in which—

Figure 1 is a view in elevation of a drill-chuck provided with my improved device for turning the sleeve. Fig. 2 is a view in central vertical section through the chuck. Fig. 3 is a detail perspective view of the jaw-operating ring. Fig. 4 is a detail view of the device looking from the bottom.

Devices for mechanically rotating the sleeve to open or close the chuck-jaws of a drill-chuck have heretofore been employed; but objections are found to the use of such devices, for the reason that projections thereon interfere with the use of the tool, as when the chuck is grasped by the hand to stop its rotation. In drill-chucks of this class very small tools are frequently employed, and in the devices above referred to heretofore used an objection has been found from the fact that undue strains are placed upon the parts, whereby the shank of the drill is crushed, thus destroying the tool for future use and also destroying its alinement in the chuck. In such prior devices to obtain an excessive movement of the chuck-jaws the sleeve is frequently rotated by hand, for the reason that it may be operated faster by such means, the mechanical means being employed for obtaining only a slight movement. By the use of my improved device hereinafter described, which obviates the objections above noted, a device is provided in which the sleeve may be rapidly rotated to provide excessive movement of the chuck-jaws, such rotation being more rapid than can be secured by grasping the sleeve with the hand.

In the accompanying drawings the letter *a* denotes the body of the chuck that is supplied with a shank *b* as a means of securing the chuck in a drill-spindle or the like, this shank being preferably separately formed from the body *a* and secured in a socket *c* therein. The body part is provided with a peripheral groove *d*, in which a jaw-operating ring *e* is located. Grooves *f* are formed lengthwise through the body of the chuck, extending in a diagonal direction from the outer surface near the upper end toward the center and opening into a jaw-recess *g* at the bottom of the chuck. Jaws *h*, preferably three in number, are located in these grooves and are provided on their outer surfaces with screw-threads fitting the interior screw-threaded surface of the ring *e*. The ring being held from longitudinal movement on the chuck-body by engagement with the groove *d*, as the ring is rotated the chuck-jaws are moved lengthwise in the grooves in the chuck-body. This ring is formed, preferably, in two sections, as shown in Fig. 3 of the drawings, and a sleeve *i* closely surrounds the body part *a*, fitting the same in a manner to have a free rotating movement thereon. This sleeve is secured to the ring *e* as by means of screws *k* passing through the sleeve into the ring.

The sleeve *i* is provided on its outer surface with recesses forming teeth 1, extending circumferentially about the sleeve. An opening *a'* is formed in the body of the chuck, preferably underneath the sleeve, in which the end of a spindle 2 of a key for turning the sleeve may be inserted. This key includes the spindle 2, a handle 3, secured to the end thereof, and a toothed disk or gear 4, so located on the spindle that when the end is inserted in the opening *a'* the teeth 5, formed on the face of the disk, will engage with the teeth 1 on the sleeve. The teeth 1 in the device shown are formed nearly midway between the ends of the sleeve; but I do not desire to confine myself to such location of the teeth, as it will be obvious that the farther said teeth are located away from the opening $a'$ the more rapid will be the rotative movement of the sleeve as the key is turned. The farther away said teeth are located from the spindle 2 the less will be the power exerted on the chuck-jaws $h$, and it will thus be obvious that the rate of movement of the sleeve $i$ as compared with the rotation of the spindle 2 may be increased or decreased and the power upon the jaws $h$ consequently increased or decreased without any change in length of the chuck-body, which for obvious reasons must be maintained.

What I claim as my invention, and desire to secure by Letters Patent, is—

A body part, chuck-jaws movable toward and from each other in said body part, a sleeve operatively connected with said jaws and having depressions in the outer surface thereof between the ends forming key-engaging means flush with the periphery, and means constructed on the body part to form a pivotal connection for a key.

HARRY P. TOWNSEND.

Witnesses:
ARTHUR B. JENKINS,
W. R. CORBIN.